(12) United States Patent
Zhong

(10) Patent No.: US 10,479,389 B2
(45) Date of Patent: Nov. 19, 2019

(54) COLLAPSIBLE SEAT ASSEMBLY AND A STROLLER WITH THE SAME

(71) Applicant: Wonderland Switzerland AG, Steinhausen (CH)

(72) Inventor: Zhi-Ren Zhong, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/448,161

(22) Filed: Mar. 2, 2017

(65) Prior Publication Data

US 2017/0297599 A1 Oct. 19, 2017

(30) Foreign Application Priority Data

Apr. 13, 2016 (CN) .......................... 2016 1 0230757

(51) Int. Cl.
*B62B 1/00* (2006.01)
*B62B 7/08* (2006.01)
(Continued)

(52) U.S. Cl.
CPC ................ *B62B 7/08* (2013.01); *B62B 7/142* (2013.01); *B62B 9/102* (2013.01); *B62B 9/20* (2013.01);
(Continued)

(58) Field of Classification Search
CPC .. B62B 7/00; B62B 7/08; B62B 7/064; B62B 7/006; B62B 7/04; B62B 7/06;
(Continued)

(56) References Cited

U.S. PATENT DOCUMENTS

| 6,102,431 | A | * | 8/2000 | Sutherland | ............. B62B 7/062 |
| | | | | | 280/47.17 |
| 6,910,708 | B2 | * | 6/2005 | Sack | ........................ B62B 7/08 |
| | | | | | 280/642 |

(Continued)

FOREIGN PATENT DOCUMENTS

| CN | 103359146 A | 10/2013 |
| CN | 104828119 A | 8/2015 |
| GB | 2496225 A | 5/2013 |

OTHER PUBLICATIONS

Search Report issued in UK counterpart application No. 1703648.4 by the UKIPO dated Aug. 21, 2017.

(Continued)

*Primary Examiner* — James M Dolak
(74) *Attorney, Agent, or Firm* — Hamre, Schumann, Mueller & Larson, P.C.

(57) ABSTRACT

A collapsible seat assembly is mounted on a frame of a stroller, and includes a joint member, a backrest support member, a leg support member and a locking mechanism. Each of a pivot portion of the backrest support member and a pivot portion of the leg support member is pivotably mounted on the joint member. The locking mechanism is disposed between the pivot portions to lock or unlock the backrest and leg support members. The locking mechanism is configured to be actuated to move from a locking position to an unlocking position by the operation of the frame of the stroller from an unfolded state to a folded state. A stroller having the collapsible seat assembly is also disclosed.

6 Claims, 12 Drawing Sheets

(51) Int. Cl.
*B62B 7/14* (2006.01)
*B62B 9/10* (2006.01)
*B62B 9/20* (2006.01)
*F16B 12/06* (2006.01)
*B62B 7/06* (2006.01)

(52) U.S. Cl.
CPC .............. *F16B 12/06* (2013.01); *B62B 7/064* (2013.01); *B62B 2205/04* (2013.01); *B62B 2205/20* (2013.01); *B62B 2301/04* (2013.01)

(58) Field of Classification Search
CPC ........... B62B 7/062; B62B 7/086; B62B 7/10; B62B 7/14; B62B 7/142; B62B 7/145; B62B 9/102; B62B 9/20; B62B 9/10; B62B 9/104; B62B 9/12; B62B 2205/04; B62B 2205/20; B62B 2205/22; B62B 2205/06
See application file for complete search history.

(56) References Cited

U.S. PATENT DOCUMENTS

| | | | | |
|---|---|---|---|---|
| 7,367,581 B2 * | 5/2008 | Yang | ........................ | B62B 7/14 280/642 |
| 7,614,649 B2 * | 11/2009 | Kashiwagi | .......... | B60R 21/2171 280/728.2 |
| 7,681,894 B2 * | 3/2010 | Santamaria | ............. | B62B 7/142 24/589.1 |
| 7,766,366 B2 * | 8/2010 | Li | ............................ | B62B 7/08 280/642 |
| 7,798,500 B2 * | 9/2010 | Den Boer | ............... | B62B 7/062 280/47.34 |
| 8,087,689 B2 * | 1/2012 | Fritz | ....................... | B62B 7/062 280/647 |
| 8,322,744 B2 * | 12/2012 | Ahnert | ...................... | B62B 9/20 280/47.4 |
| 8,936,267 B2 * | 1/2015 | Li | ............................ | B62B 7/08 280/642 |
| 8,950,761 B2 * | 2/2015 | Chen | ......................... | B62B 7/08 280/47.36 |
| 8,985,616 B1 * | 3/2015 | Chen | ......................... | B62B 7/062 280/47.38 |
| 9,193,372 B2 * | 11/2015 | Haut | ....................... | B62B 7/008 |
| 9,193,373 B2 * | 11/2015 | Fjelland | .................... | B62B 7/08 |
| 9,260,128 B2 * | 2/2016 | Liu | ............................ | B62B 7/08 |
| 9,630,642 B2 * | 4/2017 | Zehfuss | .................. | B62B 9/102 |
| 9,796,405 B2 * | 10/2017 | Li | ............................ | B62B 7/062 |
| 10,145,159 B2 * | 12/2018 | Sukeforth | ............ | E05D 11/1007 |
| 10,150,496 B2 * | 12/2018 | Oakes | ..................... | B62B 7/142 |

OTHER PUBLICATIONS

Search Report appended to an Office Action, which was issued to Chinese counterpart application No. 201610230757.9 by the CNIPA on Oct. 8, 2018, with an English translation thereof (2 pages).

* cited by examiner

US 10,479,389 B2

COLLAPSIBLE SEAT ASSEMBLY AND A STROLLER WITH THE SAME

CROSS-REFERENCE TO RELATED APPLICATION

This application claims priority of Chinese Patent Application No. 201610230757.9, filed on Apr. 13, 2016.

FIELD

The disclosure relates to a stroller, and more particularly to a stroller with a collapsible seat assembly.

BACKGROUND

A conventional foldable stroller generally has a removable seat assembly which is reversible in orientation relative to a stroller frame so as to allow a toddler to face forward or to face a caregiver who pushes the conventional foldable stroller from behind. When it is desired to reverse the orientation of the seat assembly, the seat assembly is removed from the stroller frame, is turned around, and is then mounted back on the stroller frame. Since such seat assembly cannot be folded together with the stroller frame, the seat assembly must be removed from the stroller frame prior to folding of the stroller frame for storage or transport. Hence, the seat assembly must be stored as a separate piece from the stroller frame, which results in inconvenience in using the stroller.

SUMMARY

Therefore, an object of the disclosure is to provide a collapsible seat assembly and a stroller with the same that can alleviate at least one of the drawbacks of the prior art.

According to the disclosure, the collapsible seat assembly is mounted on a frame of a stroller which is operable between folded and unfolded states. The collapsible seat assembly includes a joint member, a backrest support member having a backrest pivot portion which is pivotably mounted on the joint member, a leg support member having a leg pivot portion which is pivotably mounted on the joint member such that the collapsible seat assembly is operable between a folded position, where the backrest support member is close to the leg support member, and an unfolded position, where the backrest support member is remote from the leg support member, and a locking mechanism disposed between the backrest pivot portion and the leg pivot portion. The locking mechanism is operable between a locking position, where the backrest pivot portion is retained relative to the leg pivot portion so as to hold the collapsible seat assembly in the unfolded position, and an unlocking position, where the backrest pivot portion is turnable relative to the leg pivot portion so as to permit movement of the collapsible seat assembly to the unfolded position. The locking mechanism is configured to be actuated to move from the locking position to the unlocking position by the operation of the frame of the stroller from the unfolded state to the folded state.

According to the disclosure, the stroller includes a frame which includes a handle assembly, a front leg assembly, a rear leg assembly and a fold joint assembly. The handle assembly has a handle pivot portion pivotably mounted on the fold joint assembly to be turned to the folded state. The stroller further includes the collapsible seat assembly. The joint member is removably mounted on the fold joint assembly. The frame further includes a pressing member which is disposed to be slidable relative to the fold joint assembly and which has at least one pressing portion projecting from the fold joint assembly and disposed to be moved when the handle assembly is turned relative to the fold joint assembly. At least one pressed portion of the locking mechanism projects from the joint member and engages the pressing portion to be pressed by the pressing portion so as to move the locking mechanism to be disengaged from one of the backrest pivot portion and the leg pivot portion in the unlocking position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
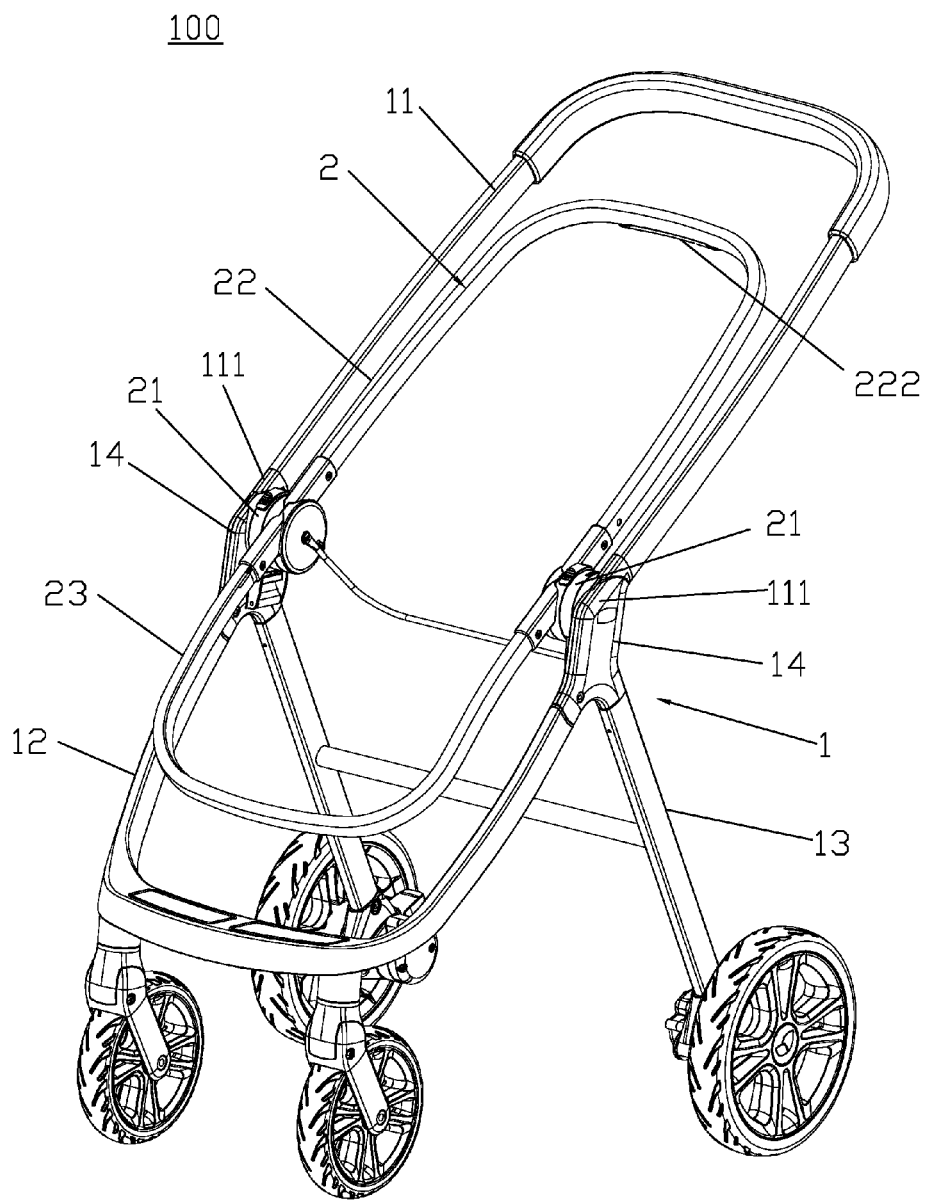
FIG. 1 is a perspective view illustrating an embodiment of a stroller according to the disclosure in an unfolded state.
Figure 12:
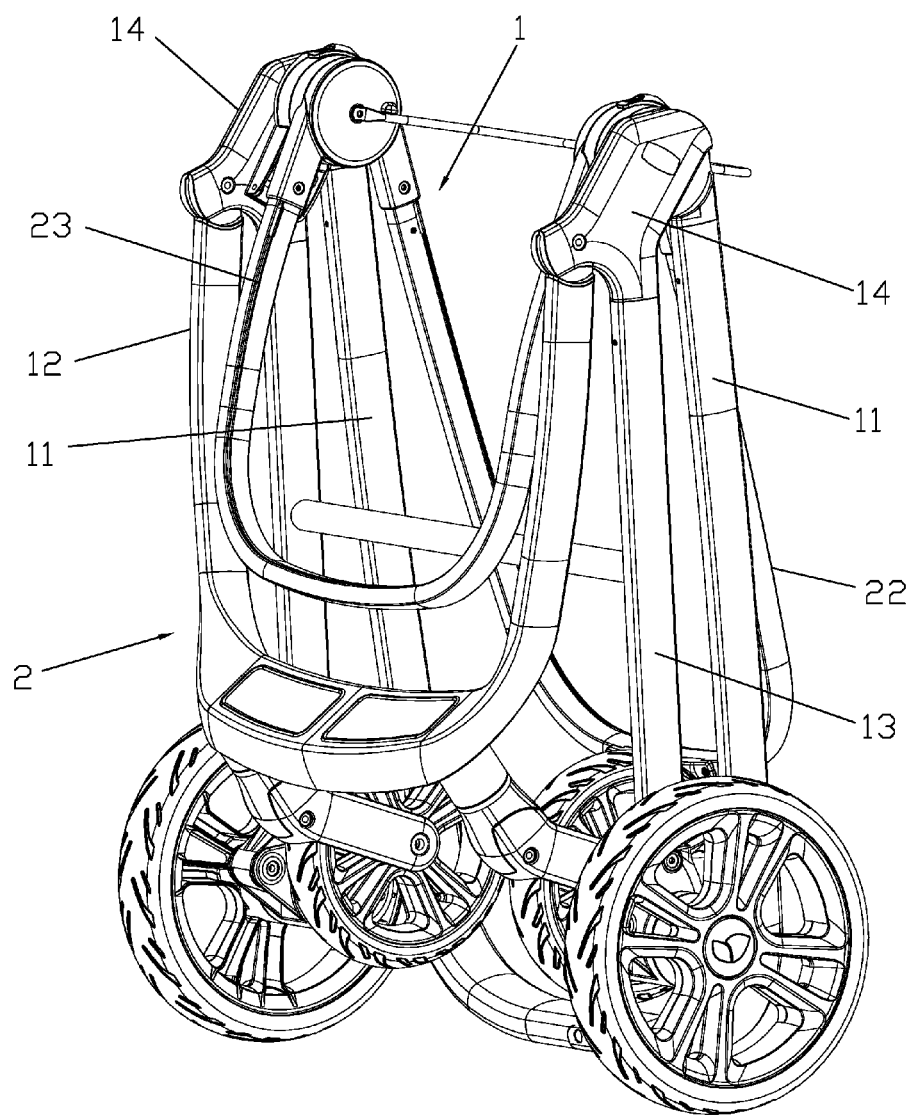
FIG. 12 is a perspective view illustrating the stroller in a folded state.

Referring to FIGS. 1 to 4 and FIG. 6, an embodiment of a stroller 100 according to this disclosure includes a frame 1 and a collapsible seat assembly 2. The frame 1 includes a handle assembly 11, a front leg assembly 12, a rear leg assembly 13 and a pair of fold joint assemblies 14. The handle assembly 11 has a pair of handle pivot portions 111 pivotably mounted on the fold joint assemblies 14, respectively, to be turned between an unfolded state of the frame 1, as shown in FIG. 1, and a folded state of the frame 1, as shown in FIG. 12. The collapsible seat assembly 2 includes a pair of joint members 21, a backrest support member 22, a leg support member 23, a pair of locking mechanisms 24 and a pair of angle adjusting mechanisms 25. The backrest support member 22 has a pair of backrest pivot portions 221 which are pivotably mounted on the joint members 21, respectively. The leg support member 23 has a pair of leg pivot portions 231 which are pivotably mounted on the joint member 21, respectively. Thus, the collapsible seat assembly 2 is operable between a folded position, where the backrest support member 22 is close to the leg support member 23, and an unfolded position, where the backrest support member 22 is remote from the leg support member 23. Each of the locking mechanisms 24 is disposed between a respective one of the backrest pivot portions 221 and a respective one of the leg pivot portions 231, and is operable between a locking position, where the respective backrest pivot portion 221 is retained relative to the respective leg pivot portion 231 so as to hold the collapsible seat assembly 2 in the unfolded position, and an unlocking position, where the respective backrest pivot portion 221 is turnable relative to the respective leg pivot portion 231 so as to permit movement of the collapsible seat assembly 2 to the unfolded position. In the following description, the joint member 21, the backrest pivot portion 221 of the backrest support member 22, the leg pivot portion 231 of the leg support member 23, the locking mechanism 24 and the angle adjusting mechanism 25 at one side of the collapsible seat assembly 2 are described in detail for the sake of clarity.

Figure 4:
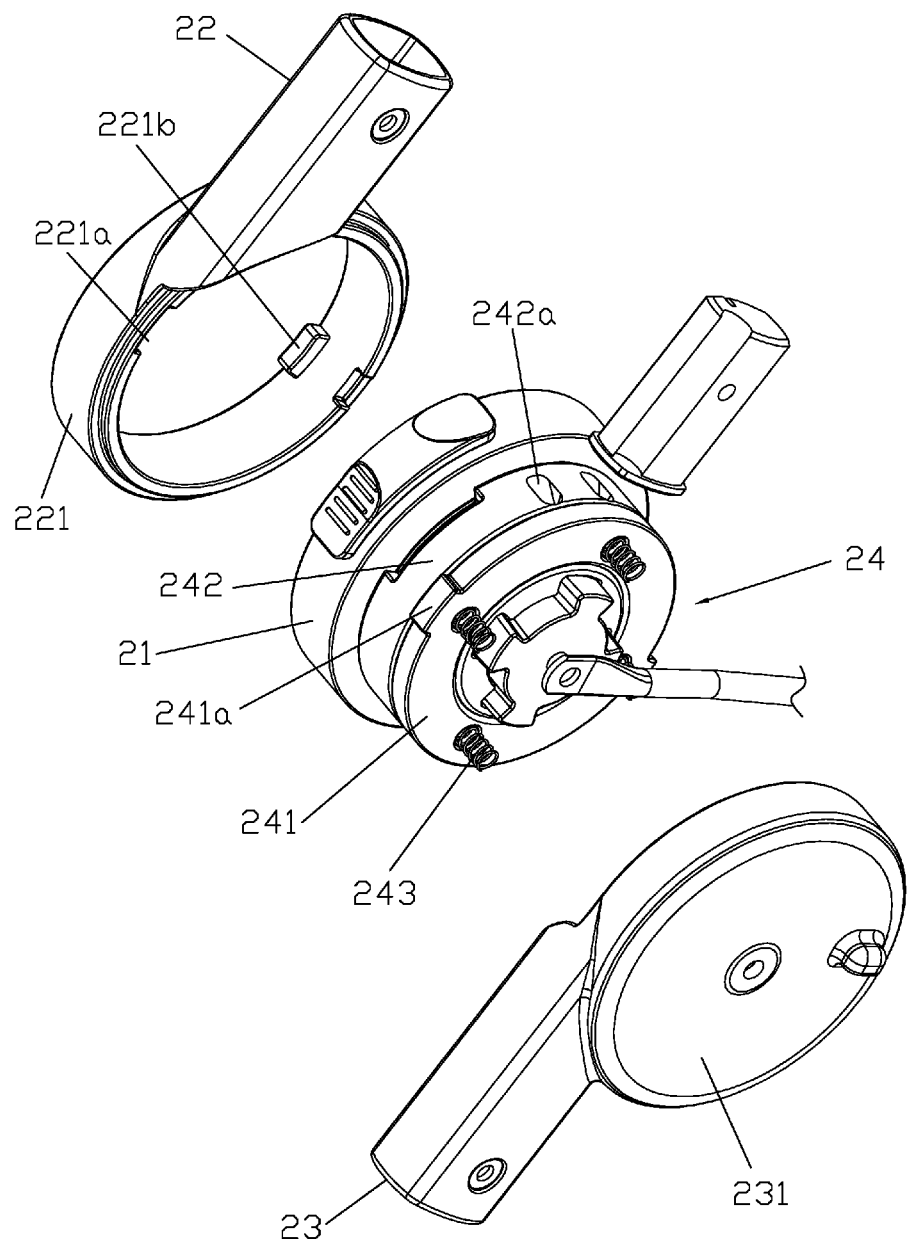
FIG. 4 is a fragmentary partly exploded perspective view of the seat assembly.
Figure 5:
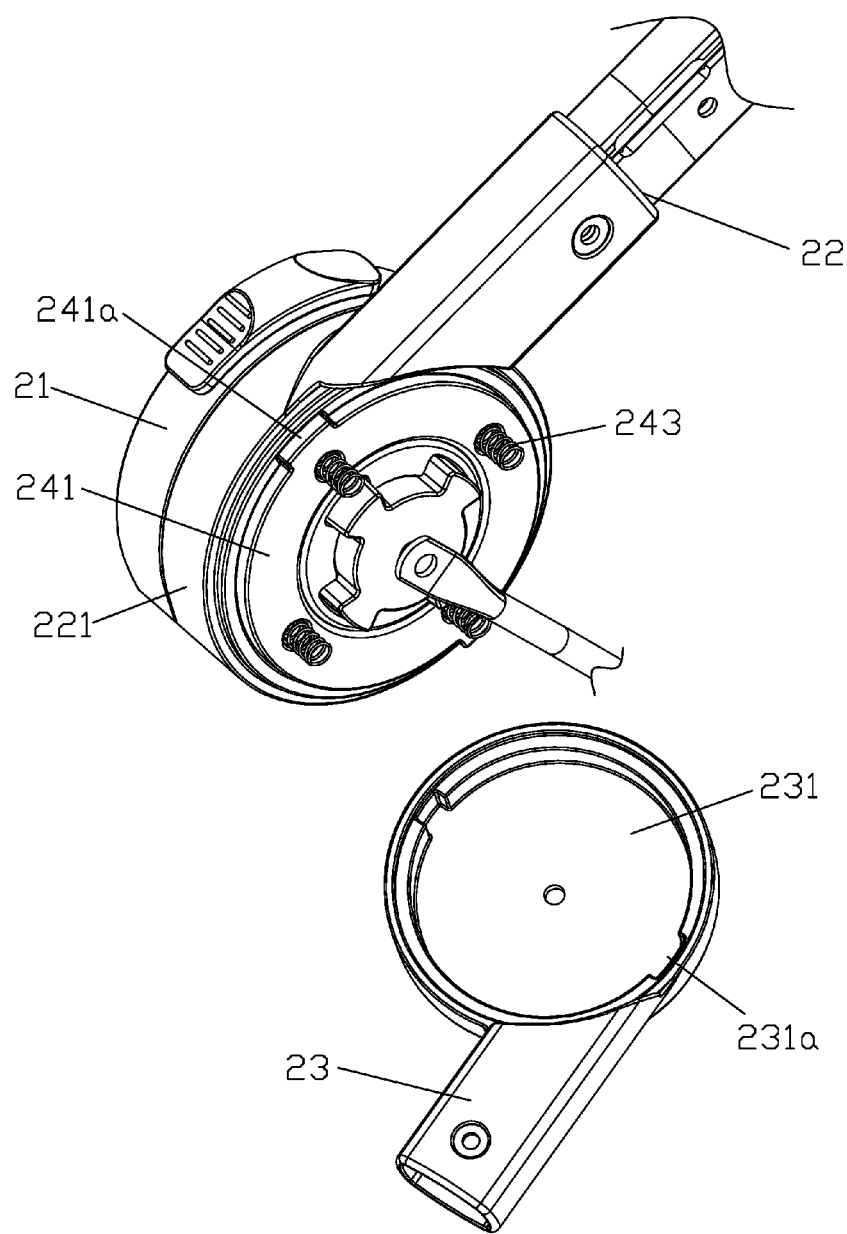
FIG. 5 is a fragmentary partly exploded perspective view of the seat assembly.

Referring to FIGS. 4 and 5, each of the locking mechanisms 24 includes a first locking member 241, a second locking member 242 and a first biasing member 243. Each of the backrest and leg pivot portions 221, 231 has a circular profile to define a central axis, and each of the first and second locking members 241, 242 is in the form of a ring. The first locking member 241 is disposed to be slidable relative to the joint member 21 along the central axis. The second locking member 242 is disposed to be slidable relative to the backrest pivot portion 221 along the central axis, and abuts against the first locking member 241. Alternatively, the second locking member 242 may be secured to the first locking member 241. The first locking member 241 is disposed to retainingly engage both the backrest pivot portion 221 and the leg pivot portion 231 in the locking position so as to lock the backrest and leg support members 22, 23, and to be disengaged from the backrest pivot portion 221 in the unlocking position so as to unlock the backrest and leg support members 22, 23. Specifically, each of the backrest and leg pivot portions 221, 231 has an engaging recess (221a, 231a). The first locking member 241 has at least one locking portion (241a) at a periphery thereof. The locking portion (241a) is disposed to engage both the engaging recesses (221a, 231a) in the locking position, and to be disengaged from the engaging recess (221a) of the backrest pivot portion 221 and engage the engaging recess (231a) of the leg pivot portion 231 in the unlocking position. The first biasing member 243, such as four compression springs, is disposed between the first locking member 241 and the leg pivot portion 231 to bias the locking portion (241a) of the first locking member 241 to engage both the engaging recesses (221a, 231a) so as to ensure the locking of the backrest and leg support members 22, 23.

Figure 2:
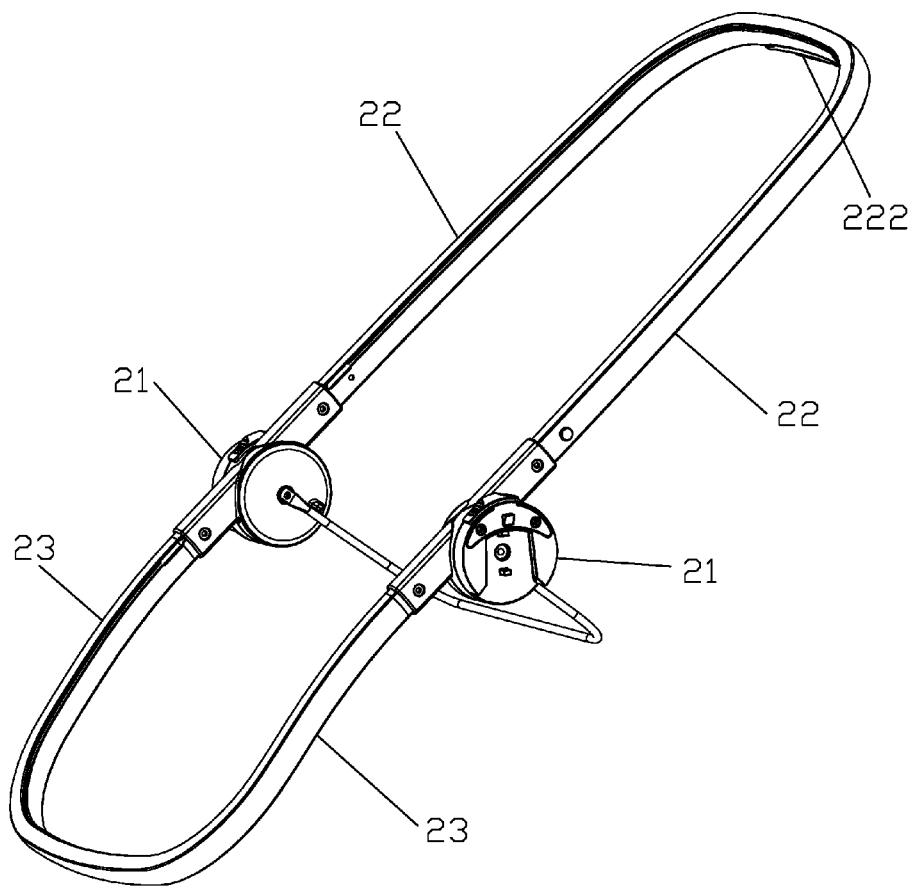
FIG. 2 is a perspective view illustrating an embodiment of a collapsible seat assembly according to the disclosure.
Figure 3:
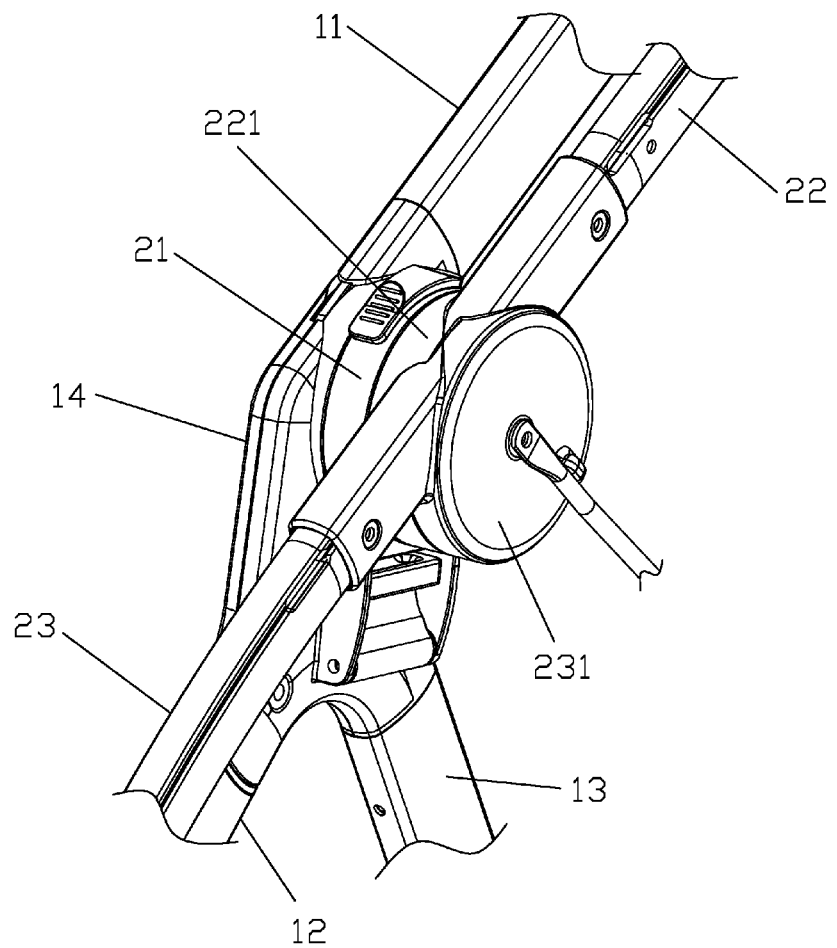
FIG. 3 is a fragmentary perspective view illustrating the seat assembly connected to a frame of the stroller.
Figure 6:
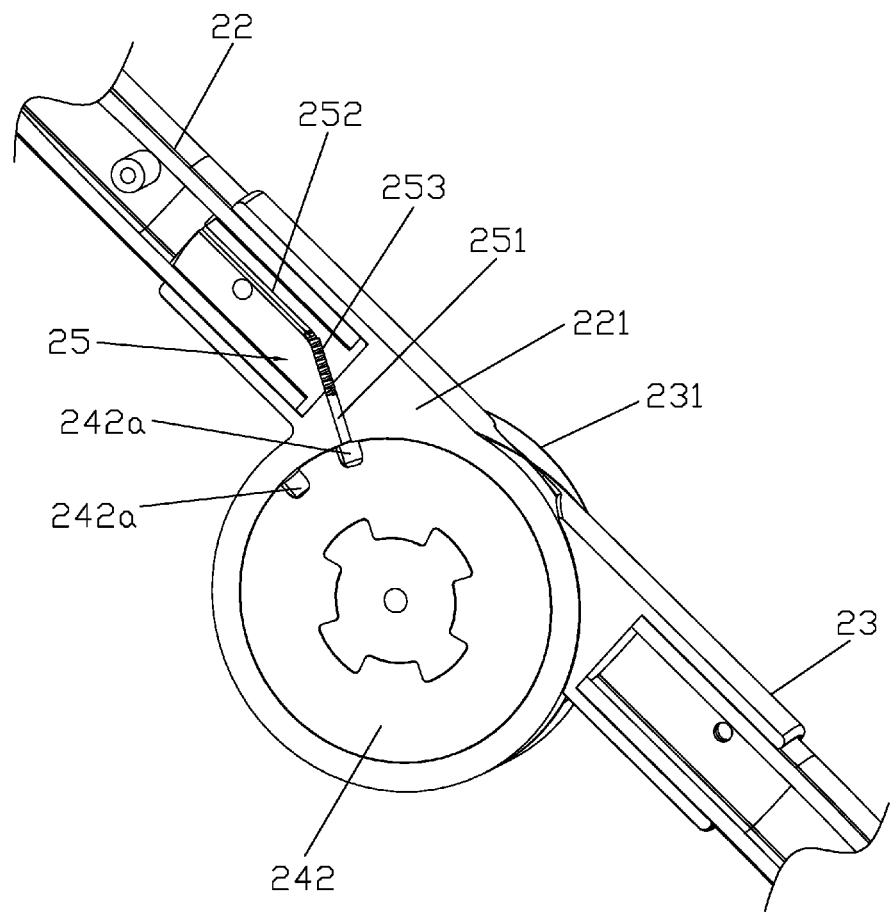
FIG. 6 is a fragmentary schematic view illustrating the seat assembly.
Figure 7:
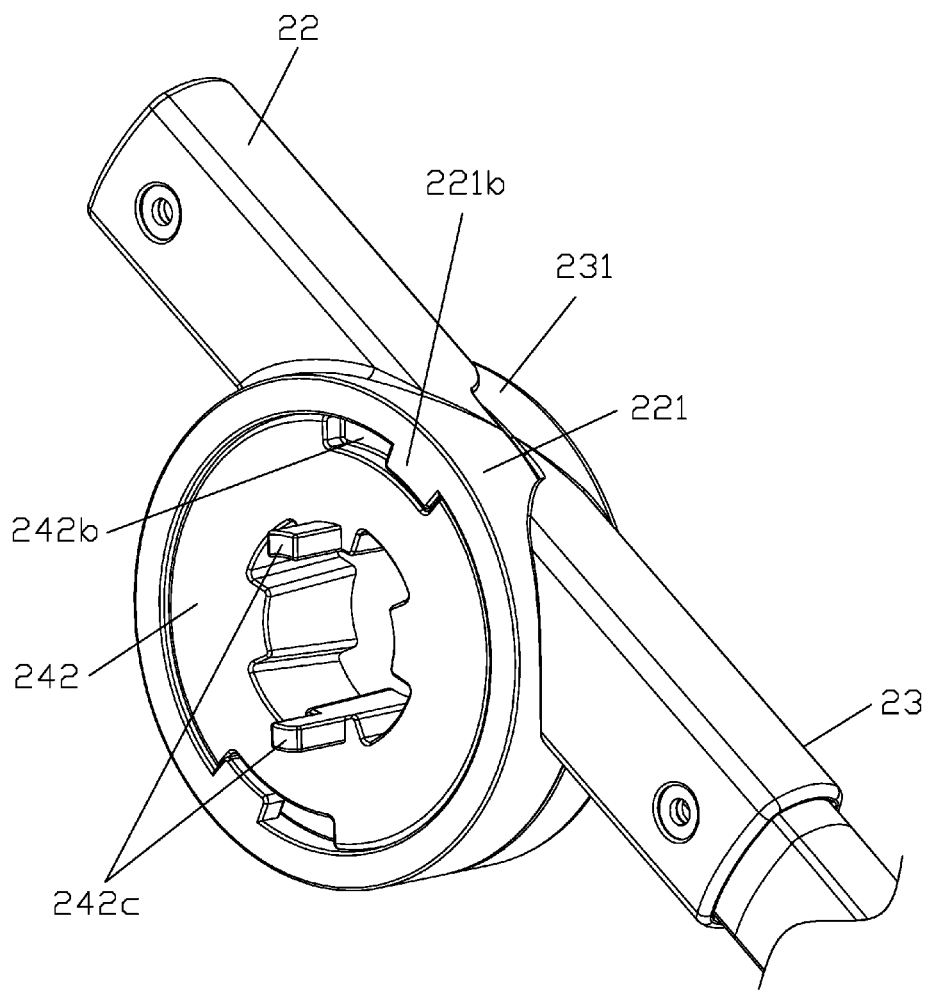
FIG. 7 is a fragmentary perspective view of the seat assembly.

With reference to FIGS. 4, 6 and 7, the second locking member 242 has a plurality of retaining grooves (242a) (e.g., two retaining grooves in this embodiment) at a periphery thereof to be angularly displaced from each other about the central axis. Each of the angle adjusting mechanisms 25 includes a retaining member 251, an operating member 252 and a second biasing member 253. The retaining member 251 is disposed in the backrest support member 22 to be movable relative to the backrest pivot portion 221, and to be engaged in a selected one of the retaining grooves (242a) so as to retain an angular position of the backrest support member 22 relative to the second locking member 242. The second biasing member 253 is a compression spring in this embodiment, and is disposed to bias the retaining member 251 to be engaged in the selected one of the retaining grooves (242a). The operating member 252 is a steel wire in this embodiment, and has an end connected to the retaining member 251, and an opposite end connected to an operated member 222 that is disposed on a crossbar of the backrest support member 22 for being manually operated, as shown in FIG. 2. The second locking member 242 has at least one guiding slot (242b) elongated around the central axis. The backrest pivot portion 221 has at least one guided pin (221b) which is disposed in and slidable relative to the guiding slot (242b) so as to guide an angular movement of the backrest support member 22 relative to the second locking member 242. Each of the retaining grooves (242a) extends to an inclined bottom surface such that the depth of the retaining groove (242a) is gradually reduced from a side proximate to the leg pivot portion 231 toward the joint member 21. Hence, when the second locking member 242 is actuated to move the first locking member 241 toward the leg pivot portion 231, the retaining member 251 can be readily disengaged from the retaining groove (242a) so as to unlock the collapsible seat assembly 2.

Figure 8:
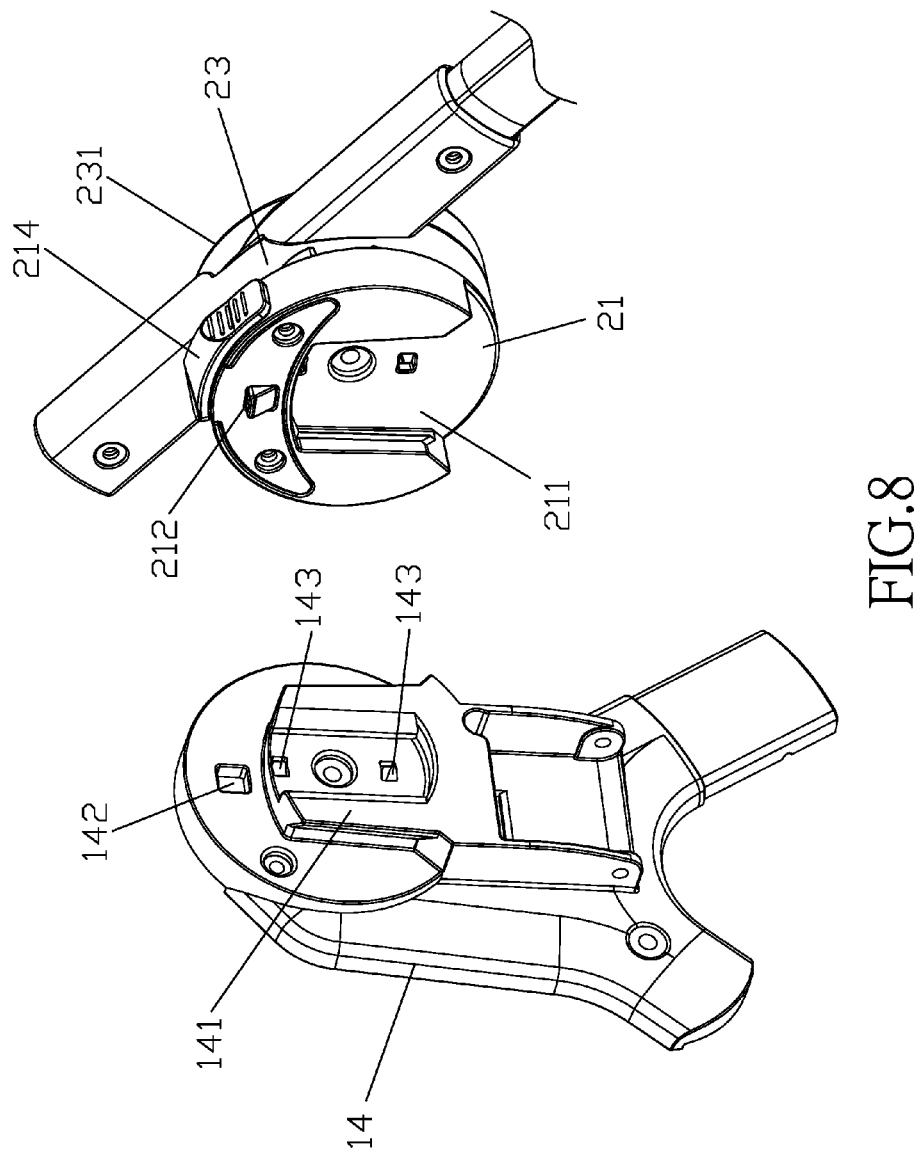
FIG. 8 is a fragmentary partly exploded perspective view illustrating the seat assembly and a fold joint assembly of the frame.
Figure 9:
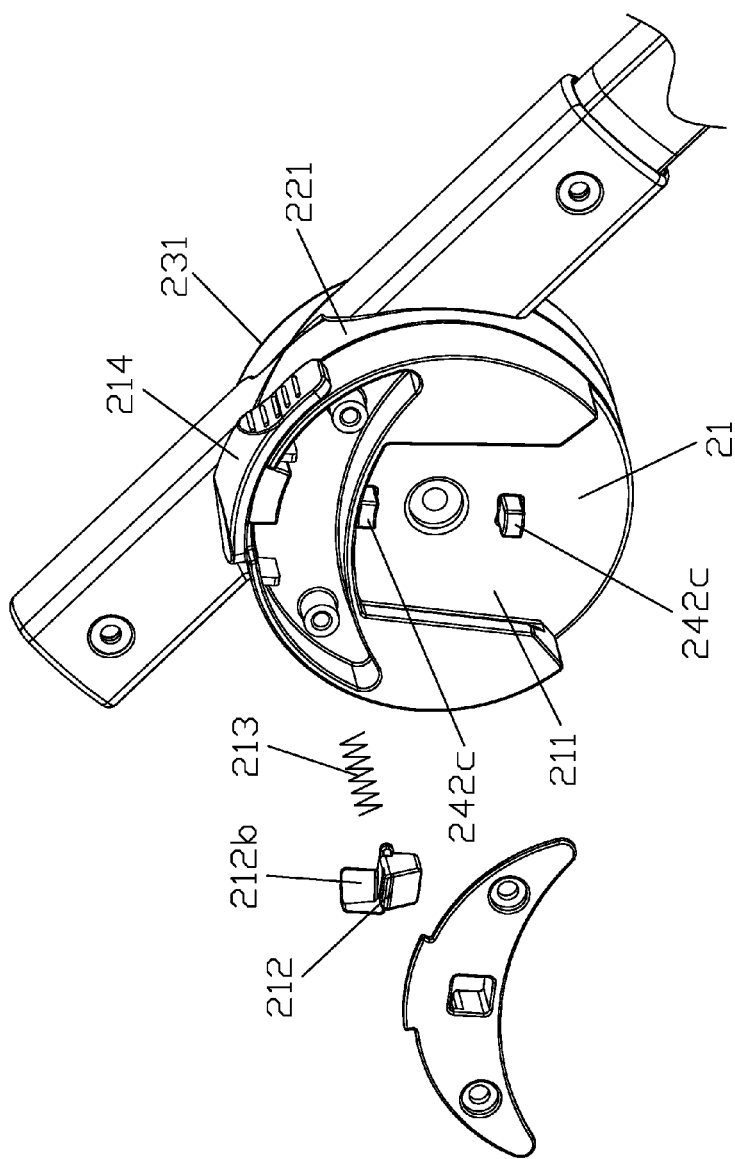
FIG. 9 is an exploded perspective view illustrating a joint member of the seat assembly.

Referring to FIGS. 1, 8 and 9, the joint member 21 is removably mounted on the fold joint assembly 14 to mount the collapsible seat assembly 2 on the frame 1 of the stroller 100. Specifically, the joint member 21 has a socket 211 opened downwardly, and the fold joint assembly 14 has a plug 141 which is configured to be inserted into the socket 211 so as to bring the joint member 21 into a non-rotatable engagement with the fold joint assembly 14. In addition, the fold joint assembly 14 has a retaining hole 142 formed above the plug 141, and the joint member 21 further has a retaining pin 212 which is disposed to be inserted into the retaining hole 142 when the joint member 21 is mounted on the fold joint assembly 14 so as to retain the joint member 21 to the fold joint assembly 14. The retaining pin 212 is disposed on and slidable relative to the joint member 21. A fourth biasing member 213 is disposed between the retaining pin 212 and an inner wall of the joint member 21 to bias the retaining pin 212 toward the retaining hole 142. The fourth biasing member 213 is a compression spring in this embodiment. The retaining pin 212 has an actuated surface (212b). An operating button 214 is disposed on and slidable relative to the joint member 21, and abuts against the actuated surface (212b) of the retaining pin 212 such that the operating button 214 is manually operable to disengage the retaining pin 212 from the retaining hole 142. By means of retaining the retaining pin 212 in the retaining hole 142, the joint member 21 is retainingly mounted on the fold joint assembly 14 to prevent unintended removal of the joint member 21 from the fold joint assembly 14.

Figure 10:
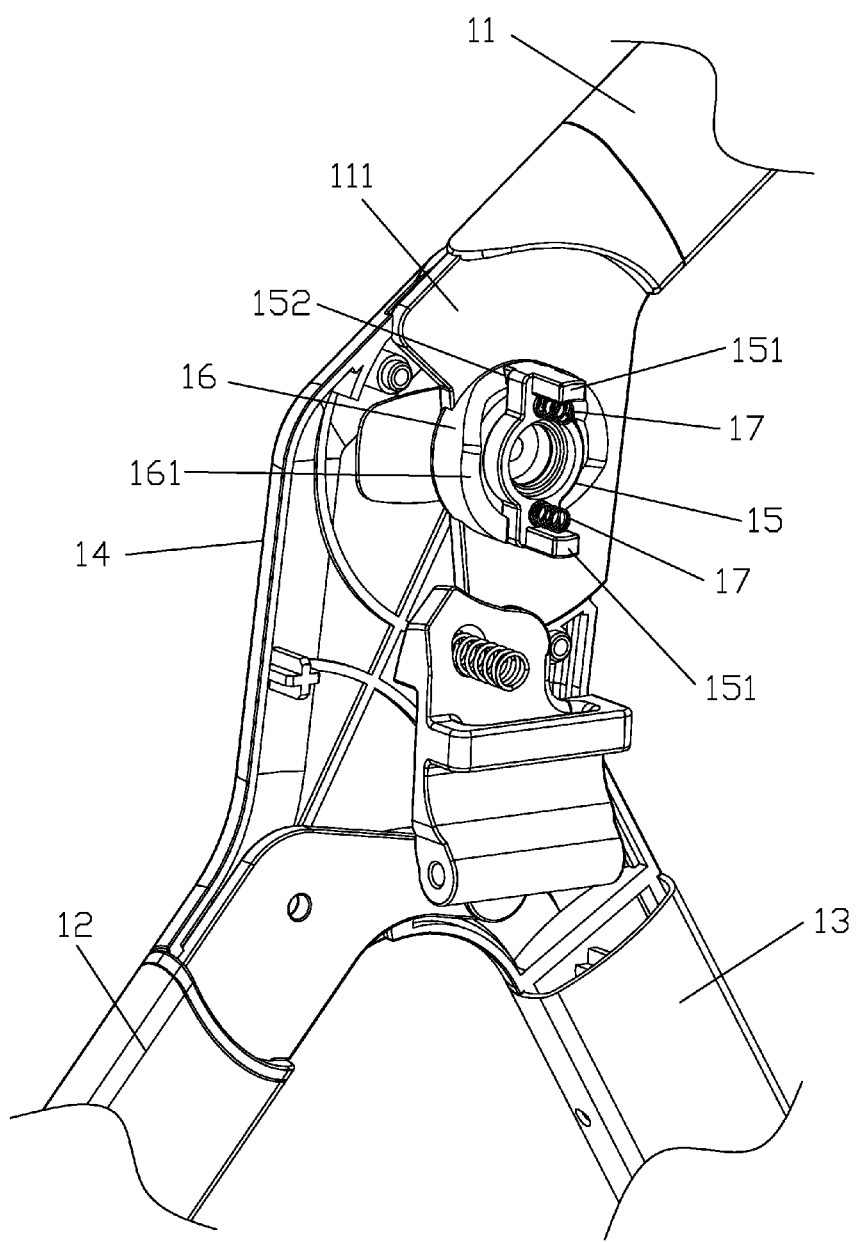
FIG. 10 is a fragmentary perspective view illustrating the structure of the fold joint assembly.

Referring to FIGS. 8 to 10, the handle assembly 11 is pivotably mounted on the fold joint assembly 14 through the handle pivot portion 111. A locking unit (not shown) is disposed on the fold joint assembly 14 to lock and unlock the handle assembly 11 relative to the fold joint assembly 14. The fold joint assembly 14 is hollow. A pressing member 15 is disposed within and slidable relative to the fold joint assembly 14. The pressing member 15 has at least one pressing portion 151 (e.g., two pressing portions in this embodiment) projecting from the fold joint assembly 14 toward the second locking member 242. The second locking member 242 has at least one pressed portion (242c) (e.g., two pressed portions in this embodiment) which projects from the joint member 21 and which engages the pressing portion 151. The frame 1 further includes a rotary member 16 and a third biasing member 17. The rotary member 16 is secured on and turnable with the handle pivot portion 111 of the handle assembly 11, and has a spirally extending cam surface 161. The pressing member 15 has a cam portion 152 which abuts against the cam surface 161. Thus, a torque generated by turning of the rotary member 16 is converted into a pressing force to press the pressing member 15 along the central axis. Thus, when the handle assembly 11 is turned to the folded state, the rotary member 16 is turned and the pressing member 15 is moved along the central axis by turning of the cam surface 161 relative to the cam portion 152 so as to bring the pressing portion 151 to project outwardly of a through hole 143 in the fold joint assembly 14, such that the pressing portion 151 presses the pressed portion (242c) of the second locking member 242. The sliding movement of the second locking member 242 drives the first locking member 241 to slide so as to permit the first locking member 241 to be disengaged from the engaging recess (221a) of the backrest pivot portion 221, and to unlock the backrest support member 22 relative to the leg support member 23. The third biasing member 17 is disposed between the pressing member 15 and the fold joint assembly 14 to bias the pressing member 15 away from the second locking member 242. The third biasing member 17 is a compression spring in this embodiment.

Figure 11:
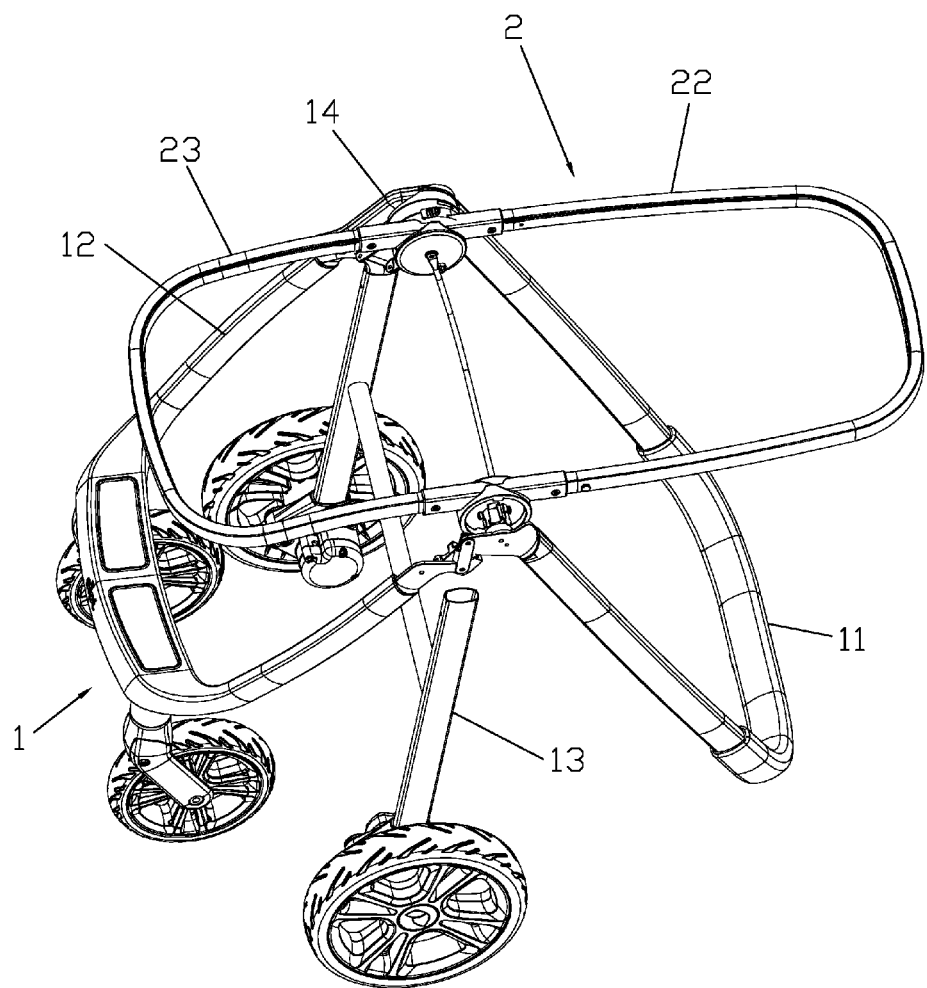
FIG. 11 is a perspective view illustrating the stroller in an intermediate state.

Referring to FIGS. 1, 11 and 12, to fold the frame 1 of the stroller 100 to the folded state, the locking unit is operated to unlock the handle assembly 11 to permit pivot movement of the handle assembly 11. The handle assembly 11 is then pivoted downwardly and the rotary member 16 is turned with the handle assembly 11. Meanwhile, with reference to FIGS. 9 and 10, by turning of the cam surface 161 relative to the cam portion 152, the pressing portion 151 of the pressing member 15 is moved to project outwardly of the fold joint assembly 14, as illustrated, to press the pressed portion (242c) to thereby permit the second locking member 242 to move within the backrest pivot portion 221 of the backrest support member 22. Further, with reference to FIGS. 4 and 5, the second locking member 242 presses the first locking member 241 to permit the locking portion (241a) to be disengaged from the engaging recess (221a) of the backrest pivot portion 221 and to be completely engaged in the engaging recess (231a) of the leg pivot portion 231. At the same time, with reference to FIGS. 4 and 6, due to movement of the second locking member 242 toward the leg pivot portion 231, the retaining member 251 is disengaged from the retaining groove (242a). Thus, an unlocking operation of the backrest and leg support members 22, 23 is conducted. Subsequently, the backrest and leg support members 22, 23 are pivoted downwardly and toward each other to collapse the seat assembly 2. The front leg assembly 12 is pivoted with the pivot movement of the handle assembly 11 to be close to the rear leg assembly 13 to fold the frame 1 of the stroller 100.

Moreover, when it is desired to adjust an angular position of the collapsible seat assembly 2 in the unfolded state of the stroller 1, a caregiver operates the operated member 222 to pull the retaining member 251 out of the retaining groove (242a). Then the seat assembly 2 is turned relative to the frame 2 about the central axis to permit the retaining member 251 to be engaged in another retaining groove (242a) so as to lock the seat assembly 2 again.

As illustrated, since each of the backrest pivot portion 221 of the backrest support member 22 and the leg pivot portion 231 of the leg support member 23 is pivotably mounted on the joint member 21 to be turnable relative to the joint member 21 and to be locked to each other by means of the locking mechanism 24, the collapsible seat assembly 2 can be operated between the folded and unfolded positions, thereby rendering folding and unfolding thereof simple and convenient. Moreover, by virtue of the pressing member 15 and the rotary member 16 being disposed on the fold joint assembly 14, the pressing member 15 having the pressing portion 151 and the second locking member 242 having the pressed portion (242c), the locking mechanism 24 is actuated to move from the locking position to the unlocking position by the operation of the frame 1 of the stroller 100 from the unfolded state to the folded state. In other words, when turning the handle assembly 11 to fold the frame 1 of the stroller 100, the collapsible seat assembly 2 can be folded to the folded position without the need to remove the collapsible seat assembly 2 from the frame 1, thereby facilitating folding of the stroller 100.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A collapsible seat assembly mounted on a frame of a stroller which is operable between folded and unfolded states, comprising:
a joint member;
a backrest support member having a backrest pivot portion which is pivotably mounted on said joint member;
a leg support member having a leg pivot portion which is pivotably mounted on said joint member such that said collapsible seat assembly is operable between a folded position, where said backrest support member is proximate to said leg support member, and an unfolded position, where said backrest support member is distal from said leg support member;
a locking mechanism disposed between said backrest pivot portion and said leg pivot portion, and operable between a locking position, where said backrest pivot portion is retained to said leg pivot portion so as to hold said collapsible seat assembly in the unfolded position, and an unlocking position, where said backrest pivot portion is movable relative to said leg pivot portion so as to permit movement of said collapsible seat assembly to the unfolded position, said locking mechanism being actuated to move from the locking position to the unlocking position by changing the frame of the stroller from the unfolded state to the folded state, said locking mechanism including a first locking member which is slidable relative to said joint member and which is disposed to retainingly engage both said backrest pivot portion and said leg pivot portion in the locking position, and to be disengaged from one of said backrest pivot portion and said leg pivot portion in the unlocking position, said locking mechanism further including a second locking member which is disposed to be slidable relative to said backrest pivot portion, said second locking member having a plurality of retaining grooves which are angularly displaced from each other about a central axis; and
an angle adjusting mechanism which includes a retaining member that is disposed to be engaged in a selected one of said retaining grooves so as to retain an angular position of said backrest support member relative to said second locking member.

2. The collapsible seat assembly as claimed in claim 1, wherein each of said backrest pivot portion and said leg pivot portion has an engaging recess, said first locking member having at least one locking portion which is disposed to engage both said engaging recesses in the locking position, and to be disengaged from one of said engaging recesses and engage the other one of said engaging recesses in the unlocking position.

3. The collapsible seat assembly as claimed in claim 2, wherein said locking mechanism further includes a first biasing member disposed to bias said locking portion to engage both of said engaging recesses.

4. The collapsible seat assembly as claimed in claim 1, wherein said angle adjusting mechanism further includes an operating member which has an end connected to said retaining member, and an opposite end connected to an operated member for being manually operated.

5. The collapsible seat assembly as claimed in claim 4, wherein said angle adjusting mechanism further includes a second biasing member disposed to bias said retaining member to be engaged in the selected one of said retaining grooves.

6. The collapsible seat assembly as claimed in claim 1, wherein said second locking member has at least one guiding slot elongated around the central axis, said backrest pivot portion having at least one guided pin which is disposed in and slidable relative to said guiding slot so as to guide an angular movement of said backrest support member relative to said second locking member.

* * * * *